S. P. Snead,

Skylight.

No. 106,967.

Patented Aug. 30, 1870.

Witness:
E. F. Huyck
W. W. Pullen

Inventor.
Samuel P. Snead

United States Patent Office.

SAMUEL P. SNEAD, OF LOUISVILLE, KENTUCKY.

Letters Patent No. 106,967, dated August 30, 1870.

IMPROVEMENT IN SKY-LIGHTS.

The Schedule referred to in these Letters Patent and making part of the same.

I, SAMUEL P. SNEAD, of the city of Louisville, in the county of Jefferson and State of Kentucky, have invented a certain new and useful Improvement in Hemispherical or Spherical Glass Sky-Lights for Buildings, of which the following is a specification.

This invention consists of a cast-iron plate or frame of any desired shape or size, with a hole through the center about two inches smaller in diameter than the size of the glass to be used, having a flange cast on the upper side of the plate, around the hole, about one-half inch high, and immediately outside; and about one inch from this flange is another similar flange, about one inch high, leaving a space between them, forming a gutter for the purpose of catching and conducting to the roof, through the holes in the outer flange, all water that may collect from condensation, or otherwise, on the inside of the glass. This last-named flange is made thicker than the other, and rabbeted out on the inside about one-half of its thickness and depth, leaving a shoulder at the bottom the same height as the inside flange, for the end of the glass sphere to rest on, while it is secured by putty or other material between the flange and glass on the outside, which renders it perfectly water-tight. The glass used in this invention may be either spherical, circular, angular, or segment.

Figure 1:
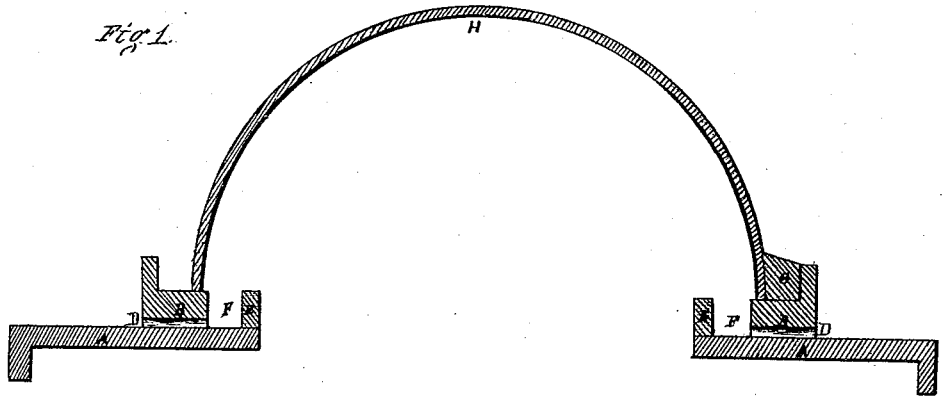

Figure 1 in the drawing is a view of the plate and glass.

Figure 2:
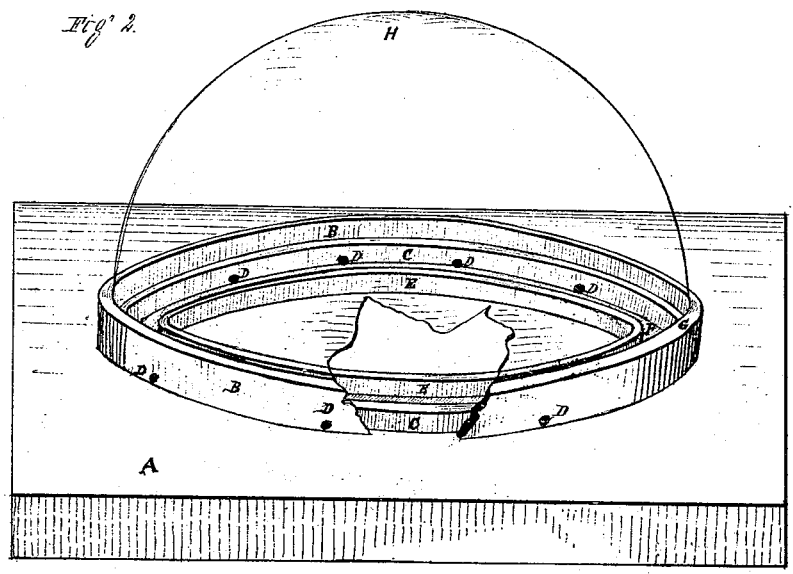

Figure 2 is a sectional view, when cut through the center.

A is the plate or frame, and is made of cast-iron.

B is the outer flange.

C is the rabbet in which the glass is secured.

G is the putty or other material by means of which it is made water-tight.

D D D are the holes through the flange below, by means of which the water is conducted from the inner gutter to the roof.

F is the gutter formed by the flange E and shoulder C.

H is the glass, which is made in the form of a sphere, but may be made in the form of a sphere, a spherical segment, or any other circular or angular shape desired.

Having thus fully described the drawing,

I claim as my invention—

The frame A, with the inner flanges E, shouldered flanges B C, provided with escape-openings D D and the gutter F, and a glass, H, secured on the shoulder C, all as herein described, for the purpose specified.

SAMUEL P. SNEAD.

Witnesses:
E. F. HUYCK,
W. W. PULLEN.